United States Patent [19]
Yabu

[11] Patent Number: 5,185,511
[45] Date of Patent: Feb. 9, 1993

[54] MULTIFUNCTION LASER ASSISTED PROCESSING APPARATUS

[75] Inventor: Maasaki Yabu, Chofu, Japan

[73] Assignee: Juki Corporation, Tokyo, Japan

[21] Appl. No.: 710,652

[22] Filed: Jun. 5, 1991

[30] Foreign Application Priority Data

Jun. 5, 1990 [JP] Japan ............................ 2-59435[U]
May 21, 1991 [JP] Japan ............................ 3-035846[U]

[51] Int. Cl.$^5$ ............................................ B23K 26/00
[52] U.S. Cl. ........................... 219/121.78; 219/121.61;
219/67; 219/68; 219/82
[58] Field of Search ................ 219/121.67, 121.72, 219/121.78

[56] References Cited

U.S. PATENT DOCUMENTS 4,672,172 6/1987 Pearl ............................... 219/121.67
4,847,462 7/1989 Soodak et al. ................... 219/121.63
4,873,413 10/1989 Uesugi et al. .................... 219/121.68

Primary Examiner—C. L. Albritton
Attorney, Agent, or Firm—Morgan & Finnegan

[57] ABSTRACT

A multifunction laser assisted processing apparatus can perform cutting processes, marking processes and drawing processes on a workpiece material. The apparatus includes a laser beam source, a work face to support the workpiece material, an X-direction movable arm on the work face, and a Y-direction movable process head to project laser beam on the workpiece material. The apparatus further includes an output adjustable mechanism to adjust the amount of the laser beam from the laser beam source. The adjustable mechanism in one embodiment has a gas control device for keeping the pressure of laser medium gas at constant level, and a DC high-voltage power unit capable of adjusting the resonance and supplying it to the laser beam source.

2 Claims, 5 Drawing Sheets

MULTIFUNCTION LASER ASSISTED PROCESSING APPARATUS

BACKGROUND OF THE INVENTION

This invention relates to laser processing apparatuses, and more particularly, to a multifunction laser processing apparatus capable of performing various types of processes upon workpieces such as cloth, fabric, paper and the like.

Conventionally, workpiece processing apparatuses have been used exclusively for specific types of purposes such as cutting, marking or drawing. Conventionally processing apparatuses of this class were chosen and used depending upon the specific type of process intended to be performed. More specifically, for drawing or marking processes, a drawing apparatus or a marking apparatus may be used which is adapted so that a drawing pen and the like or a marking pen and the like are held and moved across the workpiece in X-Y directions or in a composite direction.

When cutting processes are carried out, a well known plotter cutter may be used which is so arranged that a cutter such as a blade is held to move through the workpiece to effectuate the cut. Otherwise, instead of a blade cutter, cutting apparatuses or the like have been used in which a laser is activated to burn off and cut the workpiece.

It is, however, very troublesome to select one processing apparatus from the others according to its application since the processing apparatus is limited to the specific process. For this reason, workshops are required to install a plurality of processing apparatuses to this end. This involves disadvantages such as an increase in cost of the apparatus, in space requirements therefor, and in process inefficiency.

It is therefor an object of the present invention to overcome the disadvantages of the prior art and to provide a multifunction processing apparatus.

SUMMARY OF THE INVENTION

To eliminate the aforementioned and other disadvantages of the prior art, a multifunction laser assisted processing apparatus according to the present invention is provided. In one embodiment, the invention includes a laser beam, a laser beam source, a work face which carries thereon a workpiece material, an X-direction movable arm, a processing head movable along with the movable arm in a Y-direction for increasing energy density and irradiating the laser beam with respect to the workpiece, and an output adjustable mechanism. The output adjustable mechanism may include a gas control device for maintaining at a constant level the gas pressure of a laser medium gas fed to the laser beam source, and a DC power unit for adjusting a resonance current drained to the laser beam source whereby the resonance current is varied to properly adjust the amount of the laser beam with respect to the workpiece material so that various processes such as cutting, marking and drawing and the like may be carried out.

According to the invention, the multifunction laser assisted processing apparatus is adapted so that the Y-direction movable processing head is mounted on the X-direction movable arm through the work face in the X direction to gather and concentrate the laser beam outputted from the laser beam source, irradiating the beam to the workpiece material. The amount of the laser beam output from the laser beam source is adjustable by the output adjustable mechanism so that the amount of the laser beam output with respect to the workpiece material may be governed by a single multifunction laser assisted processing apparatus to thus carry out various processes such as drawing, marking, and cutting, thereby improving the efficiency of process operation and performance.

BRIEF DESCRIPTION OF THE DRAWINGS

The invention will be described in greater detail below by way of reference to the accompanying drawings, in which.

DETAILED DESCRIPTION OF THE DRAWINGS

One embodiment of the invention will be explained hereinafter with reference to the accompanying drawings of FIGS. 1 through 5.

Figure 1:
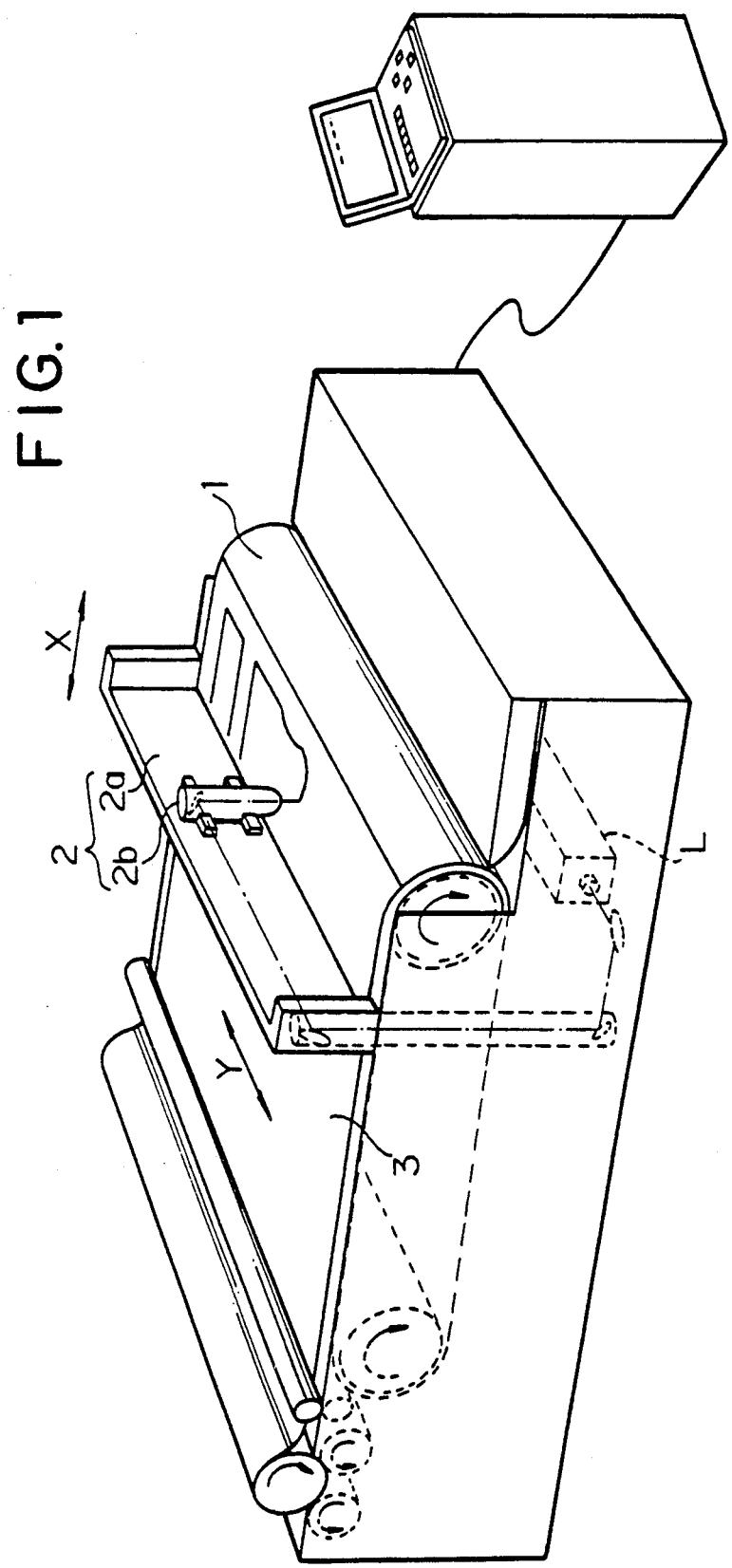
FIG. 1 is a perspective view of a multifunction laser assisted processing apparatus embodying one embodiment of the present invention.

Referring to FIG. 1, there is shown a multifunction laser assisted processing apparatus having a work face 1 on which is laid a workpiece material 3. A movable arm 2 includes an X-direction movable arm 2a moved through the work face 1, and a Y-direction movable arm 2b either acting as a processing head or supporting a processing head, the movable arm 2b moving the processing head in the Y-direction upwardly of the work face 1. The movable arm and processing head 2b are adapted to move through the work face 1 by a composite movement in association with the X-direction movable arm 2a in the X and Y directions or in a composite direction.

A laser beam source L is mounted within the instant apparatus and is adapted to output the laser beam which passes through a laser guide passage defined by a total reflection mirror (in this instance, four) and to the processing head 2b. The incident laser beam is gathered and concentrated by the head 2b to increase energy density to then output the laser beam to the workpiece material 3 disposed on the work face 1.

Figure 2:
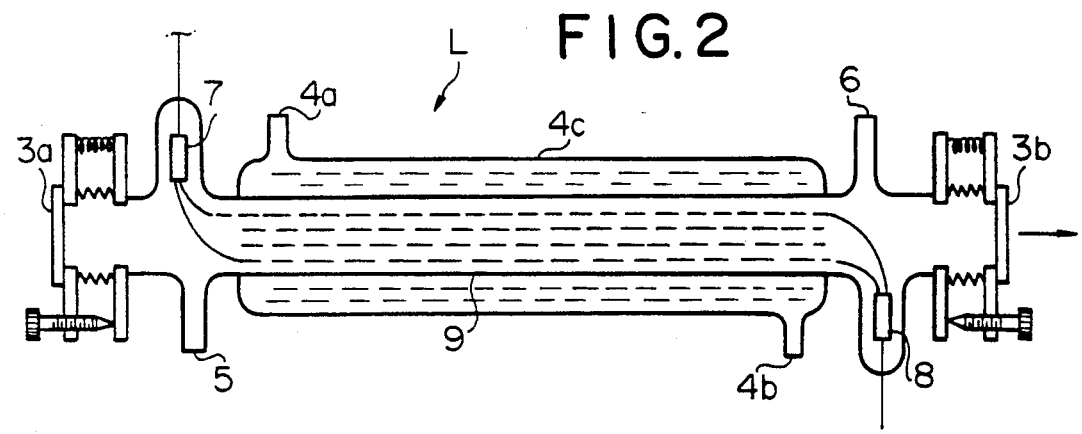
FIG. 2 is a sectional view showing how the laser beam source of a multifunction laser assisted processing apparatus according to the invention is arranged.

A laser resonator as the laser beam source L is shown in FIG. 2, wherein numeral 9 designates a discharge tube at the opposite ends of which one total reflection mirror 3a (FIG. 2), and a partial reflection mirror 3b are mounted, respectively. A cathode 7 and an anode 8 are arranged in the vicinity of the mirrors. A discharge tube 5 is connected to a vacuum pump (not shown) whereas an insert tube 6 is so mounted as to feed laser medium gas to the inside of the discharge tube 9. A cooling jacket 4c is so provided as to encircle the discharge tube 9 and includes an inlet 4a by which cooling water is supplied, and an outlet 4b from which the water is discharged to cool the discharge tube 9 when the laser beam is outputted.

As is well known, when voltage is applied to both of the cathode 7 and the anode 8, the laser medium gas impinges against an electron fed to the discharge tube 9 to generate the laser beam. This laser beam is resonant between the mirrors 3a, 3b to emit the beam through the partial reflection mirror.

Figure 3:
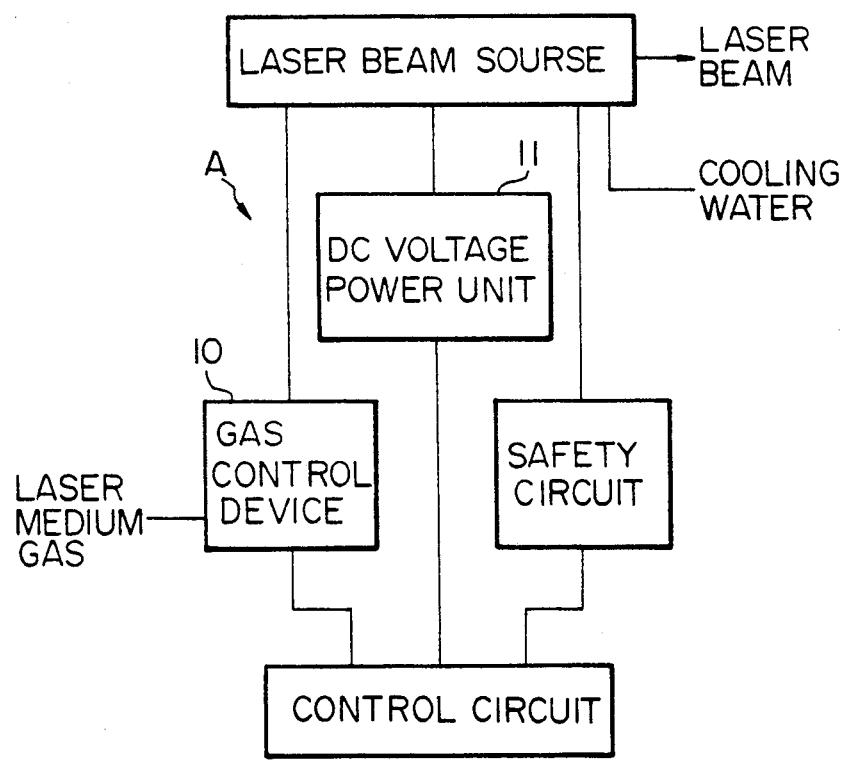
FIG. 3 is a block diagram showing the manner in which the laser beam source is connected to the other components in accordance with one embodiment of the invention.

The laser beam source L is connected to a gas control device, a DC high-voltage power unit, and a safety circuit, as shown in FIG. 3. As seen from FIG. 3, an output adjustable mechanism A consists of a gas control unit 10 and a DC high-voltage power unit 11. The gas control unit 10 is interposed between a supply source of the laser medium gas and the laser beam source L to maintain the gas pressure of the laser medium gas fed to the laser beam source L at a constant level at all times (for example, 50 mb).

The DC high-voltage power unit 11 varies voltage fed to the laser beam source L which obtains the gas pressure held at a constant level so that the amount of the laser beam output is varied to the desired level.

Figure 4:
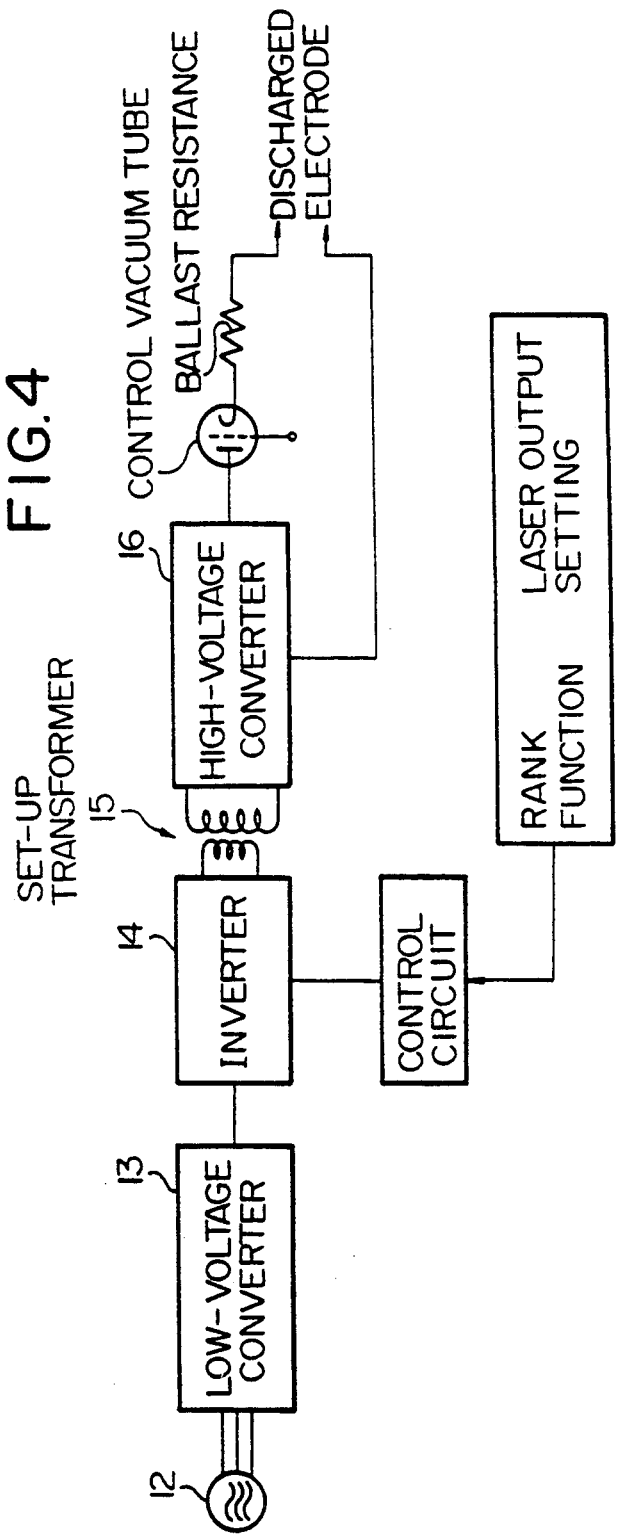
FIG. 4 is a block diagram showing a DC high-voltage power unit used in accordance with one embodiment of the invention.
Figure 5:
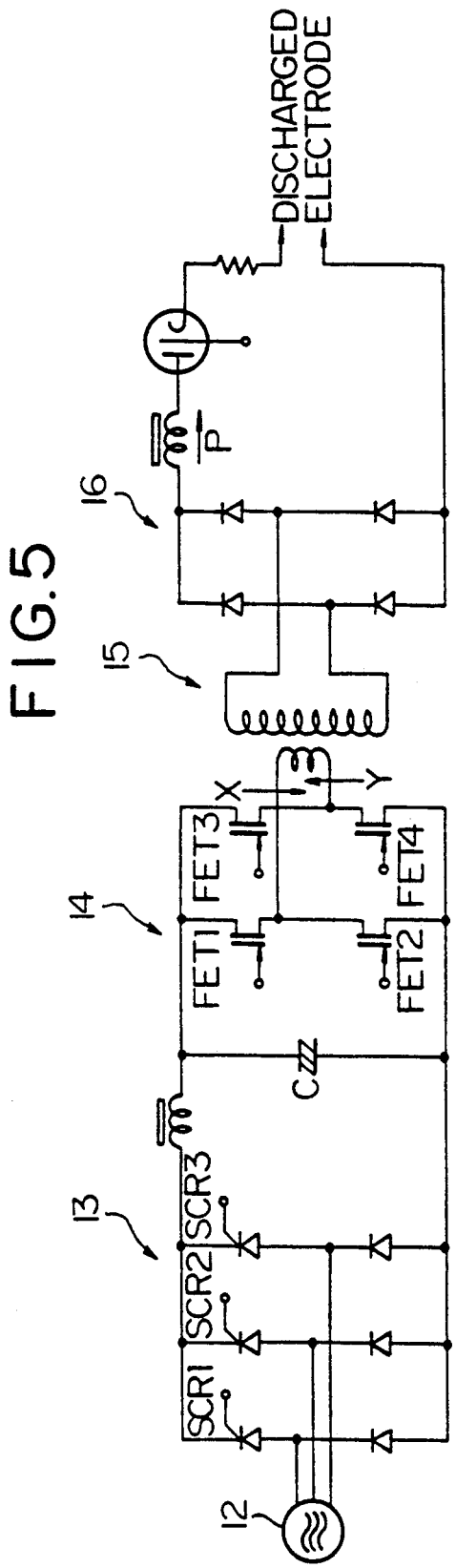
FIG. 5 is a circuit diagram of a DC high-voltage power unit used in accordance with one embodiment of the invention.

FIGS. 4 and 5 are block and circuit diagrams, respectively, of the DC high voltage power unit. A three phase AC power source 12 is shown in FIG. 5 where each current draws a Sin curve which is 120 degrees out of phase. A low-voltage converter 13 adapted to convert only the plus areas of SCRs 1, 2, and 3 to a DC current and to charge the same to a condenser C. Then, the condenser C discharges the charged current and drains the same to a set-up transformer 15 at which time FET 1, FET 4 of an inverter 14 are in a closed condition whereas FET 2, and FET 3 are in an open condition to apply the current in the direction of an arrow X. In contrast, when the inverter 14 is brought in a reverse condition, the current is drained in the direction of an arrow Y to generate an AC current.

The AC current which flows through the set-up transformer 15 increases the voltage to a high level and is then converted by a high-voltage converter 16 to the DC current. This DC current flows in the direction of an arrow P at all times and is fed to the laser beam source L.

The multifunction laser asserted processing apparatus as above arranged is capable of carrying out various processes such as marking, drawing and cutting with respect to the workpiece material 3 since the output adjustable mechanism A is caused to render the gas pressure of the laser medium gas constant whereas the resonance current is readily varied by use of adjustable means such as a volume knob and the like so that the amount of the laser beam output from the laser beam source L is set to the desired level.

Tables 1 and 2 illustrate examples of the amount of the laser beam intensity output according to each of processes with respect to the material to be processed and the configuration thereof.

TABLE 1

| Web | Process | Output (W) | Material |
|---|---|---|---|
| cloth (heaviest) | cutting | 100 | 14 oz. denim, vinyl leather velvet, velours (over coat), corduroy (heavy) |
| cloth (heavier) | cutting | 90 | 10 oz. denim, wool, gabardine, flano, jersey, tweed, cashmere, cotton suede, felt |
| cloth (normal) | | 80 | velvet, flannel, tricot, mixed wool, wool melton, taffeta, knit good, amunzen |

TABLE 1-continued

| Web | Process | Output (W) | Material |
|---|---|---|---|
| cloth (slightly light) | | 60 | summer wool, broadcloth, double georgette, shirt, blouse, voile, shantung |
| cloth (light) | | 40 | lining cloth, lawn, sheer, gingham, chiffon |
| cloth (lightest) | | 30 | georgette, organdy, France, knit good |

TABLE 2

| Web | Processing | Output (W) | Material |
|---|---|---|---|
| plastic sheet (heavy) | drawing | 20 | foam board t = 0.8 |
| | marking | 40 | |
| | cutting | 100 | vinyl chloride sheet t = 1.0 |
| plastic sheet (normal) | drawing | 10 | |
| | marking | 30 | vinyl chloride sheet t = 0.5 |
| | cutting | 80 | |
| plastic sheet (light) | drawing | 10 | |
| | marking | 20 | vinyl chloride sheet t = 0.3 |
| | cutting | 60 | |
| cardboard (heavy) | drawing | 10 | pressboard t = 0.8 |
| | cutting | 100 | whiteboard t = 1.0 |
| cardboard (light) | drawing | 10 | pressboard t = 0.4 |
| | cutting | 80 | whiteboard t = 0.5 |
| paper | drawing | 10 | plotter paper |
| | cutting | 30 | |

As is apparent from the Tables 1 and 2, for drawing on the workpiece, the amount of the laser beam output is set to the order of 10(W) to 20(W), and for marking on the workpiece, the amount of the laser beam output is set to the order to 20(W) to 40(W) to a relatively low extent to involve a scorching on the surface of the workpiece.

On the other hand, for cutting the workpiece, the amount of the laser is set to the order 30d(W) to 100(W) to a relatively high extent to burn and cut the workpiece 3.

As set forth herein before, the multifunction laser assisted apparatus includes the X-direction on movable arm 2a movable through the work face, and the Y-direction movable processing head 2b mounted on the arm 2a whereby the laser beam outputted from the laser beam source L is gathered and concentrated by the processing arm 2b to increase energy density and to irradiate the beam to the workpiece material 3. The amount of laser beam output is adjusted by the output adjustable mechanism so that various processes such as drawing, marking, and cutting and the like may be carried out with respect to the workpiece by only one instrument.

The multifunction laser assisted apparatus is capable of varying the current of the resonator to require a relatively small amount of laser beam output from the laser beam source and to provide scorching on the surface of the workpiece, thereby performing drawing and marking processes. In contrast, when the amount of laser beam output from the laser beam source is more, the workpiece is burned off and cut.

Although the invention has been described in detail herein by way of reference to the preferred embodiments, it should be understood that the invention is not limited to the disclosed embodiments but should be interpreted in accordance with the claims which follow.

I claim:

1. A multifunction laser assisted processing apparatus, comprising
a laser beam source for supplying a laser beam;
a work face for supporting a workpiece material;
a X-direction movable arm mounted on said work face;
a Y-direction movable processing head mounted on said X-direction movable arm, said processing head projecting said laser beam on the workpiece material;
an output adjustable mechanism for adjusting amount of the laser beam from said laser beam source;
said adjustable mechanism having a gas control device for keeping pressure of laser medium gas at constant level, and a DC high-voltage power unit capable of adjusting resonance current and supplying it to said laser beam source; and
whereby cutting processing, marking processing and drawing processing can be selectively performed to the workpiece material by adjustment of said adjustable mechanism.

2. A multifunction laser assisted processing apparatus, comprising:
a laser beam source for supplying a laser beam to a processing head;
means for supporting a workpiece;
means for moving said processing head across said workpiece; and
means for adjusting the intensity of said laser among a first level capable of drawing said workpiece, a second level capable of marking said workpiece, and a third level capable of cutting said workpiece.

* * * * *